United States Patent
Tanaka (10) Patent No.: US 10,536,817 B2
(45) Date of Patent: Jan. 14, 2020

(54) TERMINAL DEVICE AND COMMUNICATION METHOD FOR TRANSMITTING SPEECH DATA

(71) Applicant: JVC KENWOOD Corporation, Yokohama-shi, Kanagawa (JP)

(72) Inventor: Jun Tanaka, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 15/896,097

(22) Filed: Feb. 14, 2018

(65) Prior Publication Data
US 2018/0234815 A1 Aug. 16, 2018

(30) Foreign Application Priority Data

Feb. 14, 2017 (JP) .................................. 2017-024690
Nov. 30, 2017 (JP) .................................. 2017-229763

(51) Int. Cl.
| | | |
|---|---|---|
| H04W 4/10 | (2009.01) | |
| H04B 7/26 | (2006.01) | |
| H04W 56/00 | (2009.01) | |
| H04J 3/06 | (2006.01) | |

(52) U.S. Cl.
CPC ............ *H04W 4/10* (2013.01); *H04B 7/2678* (2013.01); *H04J 3/0682* (2013.01); *H04W 56/004* (2013.01)

(58) Field of Classification Search
CPC ...... H04B 7/2678; H04J 3/0682; H04J 3/247; H04L 1/1664; H04L 1/1678; H04W 4/10; H04W 24/02; H04W 56/004
See application file for complete search history.

(56) References Cited

U.S. PATENT DOCUMENTS

2010/0054139 A1* 3/2010 Chun .................... H04L 1/1678
370/252
2015/0181489 A1* 6/2015 Chong .................. H04W 24/02
370/331

FOREIGN PATENT DOCUMENTS

JP 2007-142488 A 6/2007
WO WO-9848535 A1 * 10/1998 .............. H04J 3/247

* cited by examiner

*Primary Examiner* — Khoa Huynh
(74) *Attorney, Agent, or Firm* — Brundidge & Stanger, P.C.

(57) ABSTRACT

A first terminal device communicates with a second terminal device through a fourth terminal device. An acquisition unit acquires a maximum transmission delay time by referring to a transmission delay time with respect to each of the second terminal device through the fourth terminal device. A communication unit transmits data to each of the second terminal device through the fourth terminal device. The communication unit prohibits, when transmission of the data is ended, new data from being transmitted over a prohibition period based on the maximum transmission delay time acquired in the acquisition unit.

8 Claims, 10 Drawing Sheets

FIG.5A
AT START OF TRANSMISSION (BEFORE ARRIVAL OF SPEECH DATA)

FIG.5B
CALL PROCEEDING (AFTER ARRIVAL OF SPEECH DATA)

FIG.5C
AT END OF TRANSMISSION (START OF PROHIBITION PERIOD)

FIG.5D
AT END OF TRANSMISSION (DURING PROHIBITION PERIOD)

FIG.7

TERMINAL DEVICE AND COMMUNICATION METHOD FOR TRANSMITTING SPEECH DATA

CROSS-REFERENCE TO RELATED APPLICATION

This application is based upon and claims the benefit of priority from the prior Japanese Patent Application No. 2017-24690, filed on Feb. 14, 2017 and Japanese Patent Application No. 2017-229763, filed on Nov. 30, 2017, the entire contents of which are incorporated herein by reference.

BACKGROUND

1. Field

The present invention relates to communication technologies and, more particularly, to a terminal device and a communication method for transmitting speech data.

2. Description of the Related Art

Push-to-Talk over Cellular (PoC) is a technology directed to Voice Over IP communication using half duplex communication on an IP network. In group communication service using PoC, a plurality of receivers receive a call from a caller. When a calling terminal device ends the transmission, a plurality of terminal devices contend to obtain a right to make a subsequent call. For example, a PoC server may grant a right to make a call to a PoC terminal device that has received a call request earliest. Further, speech is communicated in PoC group communication. It is therefore necessary to perform multicast communication. In the event that receiving terminal devices are connected via mutually different networks, the delay time in the respective networks will have an effect so that the transmission delay time differs from one receiving terminal device to another. For this reason, a terminal device with a large transmission delay from the PoC server cannot obtain a right to make a call for an indefinite period of time. In order to address unequal opportunities, the PoC server is provided with a media distribution controller or a media storage device for arbitration of a right to make a call (see, for example, patent document 1).

[patent document 1] JP2007-142488

The processes performed in a PoC server for arbitration of a right to make a call is complicated and the configuration of the PoC server is also complicated consequently. There is a need to equalize opportunities for acquisition of a right to make a call by a simple process.

SUMMARY

A terminal device according to an embodiment is adapted to communicate with a plurality of further terminal devices, and comprises: an acquisition unit that acquires a maximum transmission delay time by referring to a transmission delay time with respect to each of the plurality of further terminal devices; and a communication unit that transmits data to each of the plurality of further terminal devices. The communication unit prohibits, when the transmission of the data is ended, transmission of new data over a prohibition period based on the maximum transmission delay time acquired in the acquisition unit.

Another embodiment relates to a communication method. The method is performed in a terminal device adapted to communicate with a plurality of further terminal devices, and comprises: acquiring a maximum transmission delay time by referring to a transmission delay time with respect to each of the plurality of further terminal devices; transmitting data to each of the plurality of further terminal devices; and prohibiting, when transmission of the data is ended, new data from being transmitted over a prohibition period based on the maximum transmission delay time acquired.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Embodiment 1

A summary will be given before describing the invention in specific details. Embodiment 1 relates to a PoC terminal device. An example of speech communication is Push to Talk (PTT). In PTT, the user pushes a button during a conversation and releases the button when the conversation is ended. A plurality of PoC terminal devices can form a group. The base station device for PoC terminal devices establishes a session for the group. In this situation, one of the PoC terminal devices in the group transmits speech data in the session and a further PoC terminal device in the group receives the speech data in the session.

The user of the further PoC terminal device hears the speech from the PoC terminal device and, when the speech is ended, may wish to originate a speech responsive to the received speech. This corresponds to releasing the button in the PoC terminal device and pressing the button in the further PoC terminal device. A large transmission delay time in the further PoC terminal device results in calls missed by one another when the button is pressed for a second time in the PoC terminal device before the button is pressed in the further PoC terminal device. In order to address this, the PoC terminal device according to this embodiment establishes a prohibition period based on the maximum transmission delay time. A prohibition period is a period during which the PoC terminal device cannot transmit speech data even if the button is pressed. When the transmission of speech data is ended by releasing the button, the PoC terminal device starts a prohibition period timer. Even if the button of the PoC terminal device is pressed before the prohibition period timer expires, the PoC terminal device does not transmit the speech data.

Figure 1:
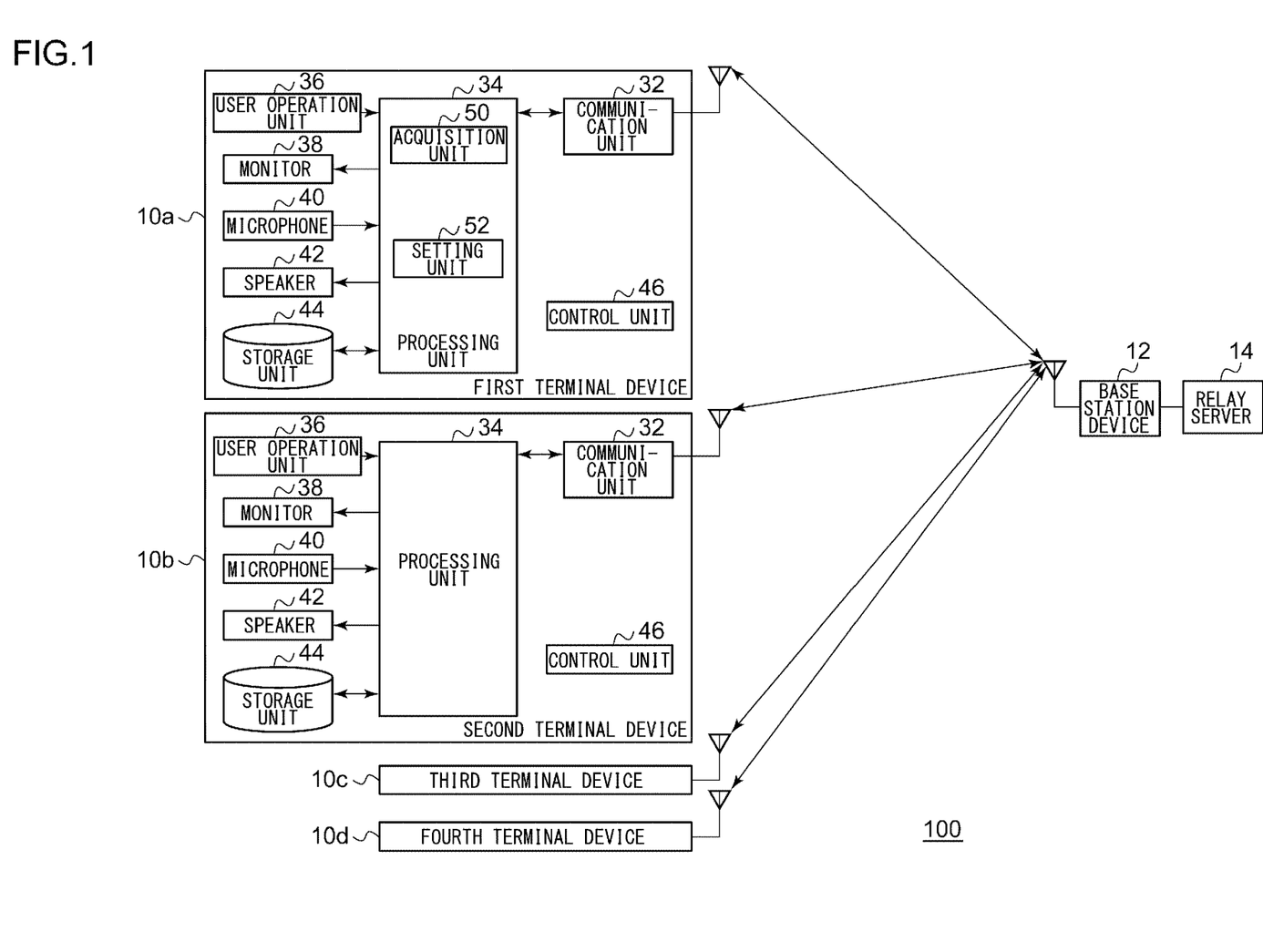
FIG. 1 shows a configuration of a communication system according to embodiment 1.

FIG. 1 shows a configuration of a communication system 100. The communication system 100 includes a first terminal device 10a, a second terminal device 10b, a third terminal device 10c, a fourth terminal device 10d, which are generically referred to as terminal devices 10, a base station device 12, and a relay server 14. The first terminal device 10a includes a communication unit 32, a processing unit 34, a user operation unit 36, a monitor 38, a microphone 40, a speaker 42, a storage unit 44, and a control unit 46. The processing unit 34 includes an acquisition unit 50 and a setting unit 52. The second terminal device 10b through the fourth terminal device 10d are configured similarly as the first terminal device 10a. For clarification of the drawings, some or all of the constituting elements are omitted. The number of terminal devices 10 included in the communication system 100 is not limited to "4", and the number of base station devices 12 is not limited to "1". If a plurality of base station devices 12 are included, the plurality of base station devices 12 are connected via a network.

The terminal device 10 is a device capable of group communication using PoC. Referring to FIG. 1, the first terminal device 10a represents a calling side of speech communication and the second terminal device 10b through the fourth terminal device 10d represent the called side of PoC speech communication. The relationship may change depending on the situation. A description will be given of speech data transmitted from the calling side and speech data received at the called side with reference to FIG. 2.

Figure 2:
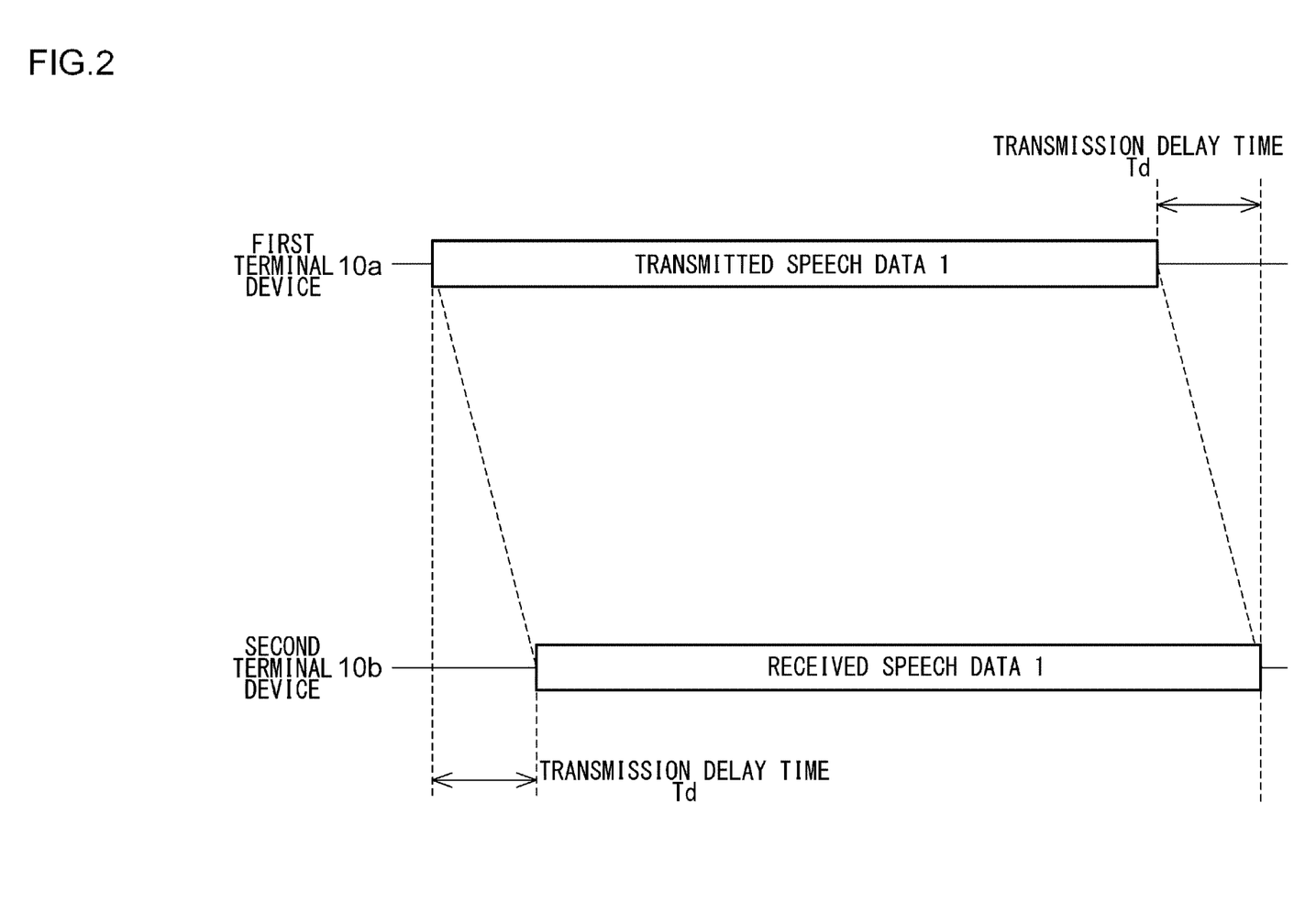
FIG. 2 shows an outline of the operation in the communication system of FIG. 1.

FIG. 2 shows an outline of the operation in the communication system 100. FIG. 2 shows the first terminal device 10a as the calling side and the second terminal device 10b as the called side. Speech data referred to as "transmitted speech data 1" is transmitted from the first terminal device 10a. The speech data is delayed by a transmission delay time Td and received in the second terminal device 10b as "received speech data 1". The transmission delay time Td differs in the second terminal device 10b through the fourth terminal device 10d. After the transmission of the speech data from the first terminal device 10a is ended, the second terminal device 10b continues to receive the speech data during the transmission delay time Td. However, the first terminal device 10a has no knowledge of this. A description will be given of situations that could possibly occur with reference to FIG. 3.

Figure 3:
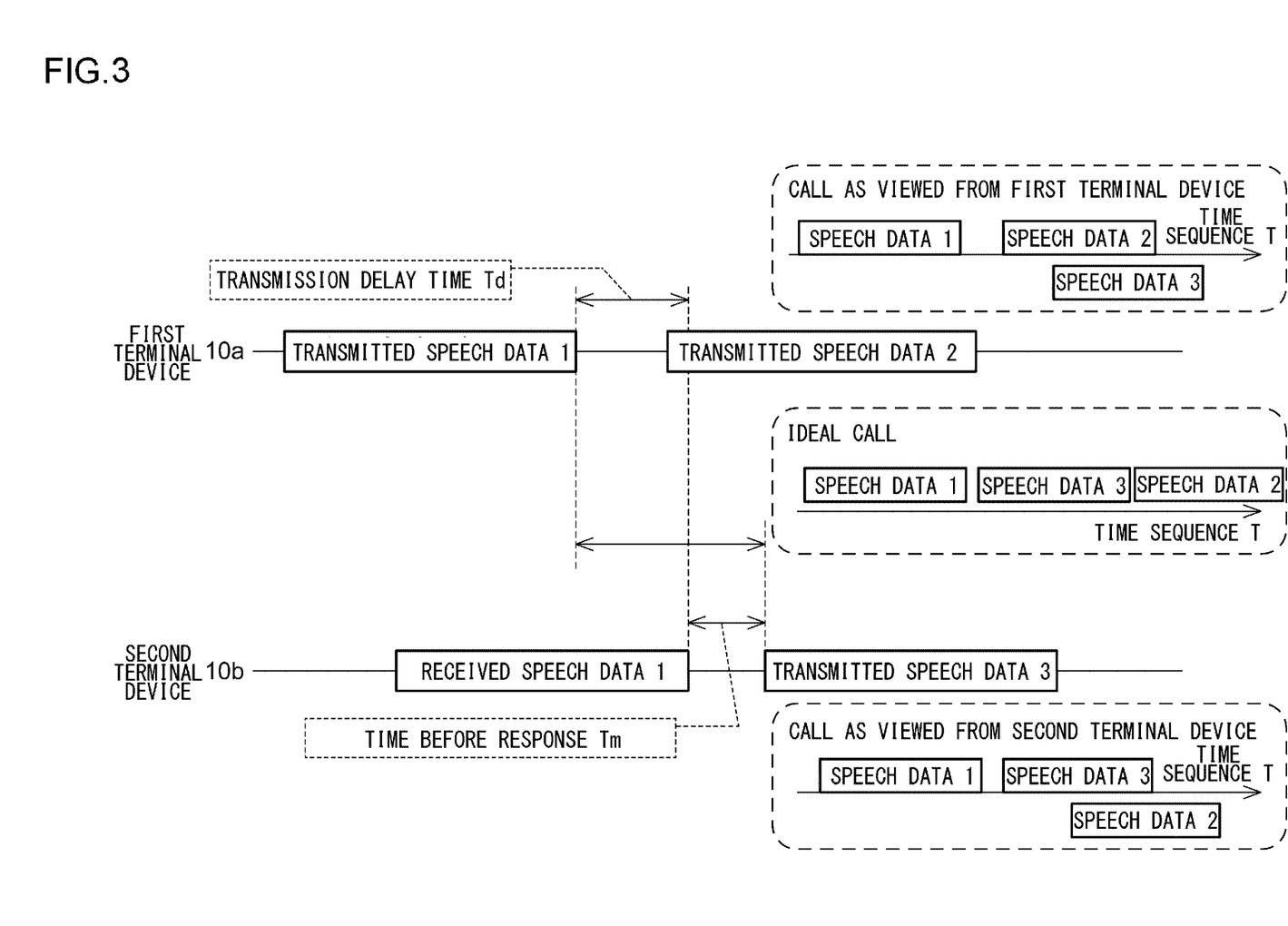
FIG. 3 shows another outline of the operation of the communication system of FIG. 1.

FIG. 3 shows another outline of the operation of the communication system 100. As in FIG. 1, it is assumed that the first terminal device 10a transmits "transmitted speech data 1", the second terminal device 10b receives "received speech data 1", and the transmission delay time is Td. After the reception of "received speech data 1" is ended, the second terminal device 10b transmits "transmitted speech data 3" after an elapse of a period of time Tm required to make a response. Meanwhile, the first terminal device 10a has no knowledge of the transmission delay time Td and so transmits "transmitted speech data 2" before the transmission delay time Td elapses subsequent to the transmission of "transmitted speech data 1" is ended.

When a call carrying speech data like this is viewed from the first terminal device 10a, "speech data 1" and "speech data 2" are transmitted in succession, and the reception of "speech data 3" occurs during the transmission of "speech data 2". Meanwhile, when a call carrying speech data like this is viewed from the second terminal device 10b, the reception of "speech data 2" occurs while transmitting "speech data 3" subsequent to the reception of "speech data 1". The content of "speech data 3" is a response to the content of "speech data 1". Therefore, an ideal call should proceed in the order of "speech data 1", "speech data 2", and "speech data 3". In essence, multicast speech communication performed in an environment of a duplex communication may result in calls missed by one another, if the first terminal device 10a originating a speech starts the subsequent transmission before the transmission of a response from the second terminal device 10b, the farthest recipient of the speech, occurs. Reference is made back to FIG. 1.

The communication unit 32 performs speech communication with a further terminal device 10 via the base station device 12. The processing unit 34 controls communication by the communication unit 32. In particular, the processing unit 34 performs processes group calls in the PoC terminal. The user operation unit 36 is comprised of a button, a touch panel, etc. and is configured to receive a user input. The button corresponds to a PTT button, and the user operation unit 36 receives an instruction to make a PTT call when the PTT button is pressed. Meanwhile, the user operation unit 36 acknowledges termination of a PTT call when the PTT button is released. The user operation unit 36 outputs a received input to the processing unit 34.

The monitor 38 is a display unit that receives an image, moving images, and a message from the processing unit 34 and displays them. If the screen of the monitor 38 is a touch panel, the monitor 38 is integrated with the user operation unit 36. The microphone 40 receives the speech from the user during a call and converts the speech into a speech signal. The microphone 40 outputs the speech signal to the processing unit 34. The speaker 42 receives the speech signal from the processing unit 34 and outputs the speech signal as a speech. The speaker 42 may output an alert sound, etc. The storage unit 44 stores the speech data and the maximum transmission delay time. The maximum transmission delay time will be described in details later. Writing in the storage unit 44 and the reading from the storage unit 44 are performed by the processing unit 34. The control unit 46 controls the operation of the terminal device 10.

When the PTT button of the user operation unit 36 is pressed, the acquisition unit 50 of the first terminal device 10a acquires the maximum transmission delay time by referring to the transmission delay time with respect to each of the plurality of further terminal devices 10. The transmission delay time is defined as a delay time from the first terminal device 10a to the further terminal device 10. The acquisition unit 50 transmits a measurement signal for measuring the transmission delay time to each of the plurality of further terminal devices 10 separately from the speech data. Three patterns of processes whereby the acquisition unit 50 acquires the maximum transmission delay time will be described below but only one of the processes may be performed.

Figure 4A:
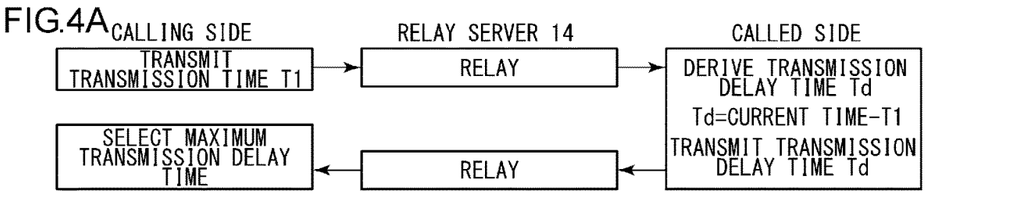
FIGS. 4A, 4B and 4C show still another outline of the operation of the communication system of FIG. 1.
Figure 4B:
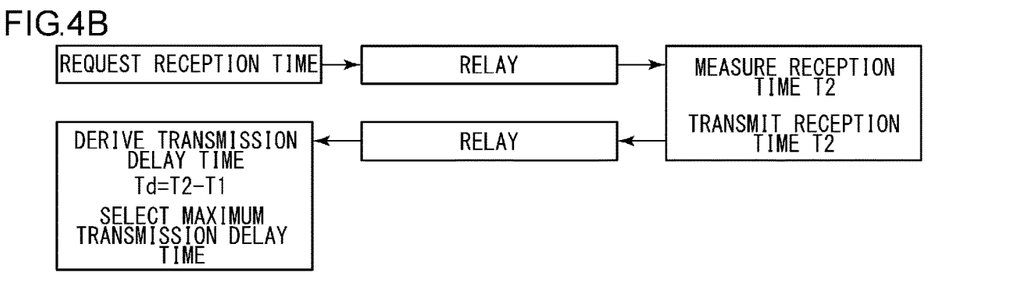
Figure 4C:
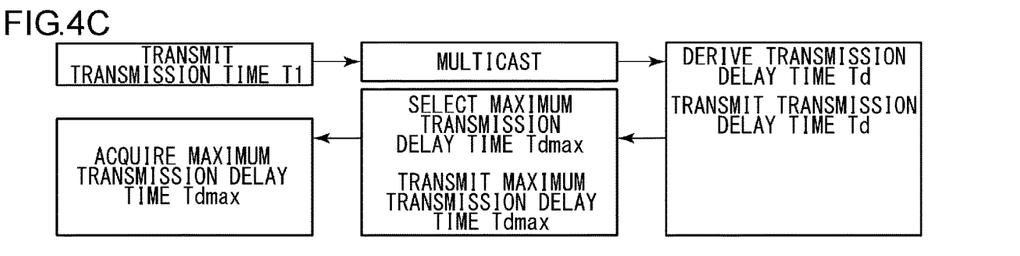

FIGS. 4A-4C show still another outline of the operation of the communication system 100. "Calling side" corresponds to the first terminal device 10a, and "called side" corresponds to each of the second terminal device 10b through the fourth terminal device 10d. FIG. 4A shows the first pattern. The calling side transmits a transmission time T1 as a measurement signal. The relay server 14 relays the transmission time T1. The called side receives the transmission time T1 and acquires the current time coinciding with the reception. The called side calculates the transmission delay time Td by subtracting the transmission time T1 from the current time. The called side transmits the transmission delay time Td. The relay server 14 relays the transmission delay time Td. The calling side receives the transmission delay time Td as a response.

As mentioned above, the called side is the second terminal device 10b through the fourth terminal device 10d. Therefore, the above process is performed for each of the second terminal device 10b through the fourth terminal device 10d. For example, the first terminal device 10a transmits a measurement signal to each of the second terminal device 10b through the fourth terminal device 10d and then receives a response from each of the second terminal device 10b through the fourth terminal device 10d. The acquisition unit 50 of the first terminal device 10a selects the maximum transmission delay time from the transmission delay time Td received from each of the second terminal device 10b through the fourth terminal device 10d.

FIG. 4B shows the second pattern. The calling side transmits, as a measurement signal, a request signal for requesting the reception time. In this process, the acquisition unit 50 stores the transmission time T1. The relay server 14 relays the request signal. The called side receives the request signal and measures the current time coinciding with the reception as a reception time T2. The called side transmits the reception time T2. The relay server 14 relays the reception time T2. The calling side receives the reception time T2 as a response. The acquisition unit 50 of the first terminal device 10a calculates the transmission delay time Td by subtracting the transmission time T1 from the reception time T2. The above process is performed for each of the second terminal device 10b through the fourth terminal device 10d. The acquisition unit 50 selects the maximum transmission delay time from the transmission delay time Td derived for each of the second terminal device 10b through the fourth terminal device 10d.

FIG. 4C shows the third pattern. The calling side transmits, as a measurement signal, the transmission time T1 to the relay server 14. When receiving the transmission time T1, the relay server 14 transmits the transmission time T1 in a multicast mode. The called side receives the transmission time T1 and acquires the current time coinciding with the reception. The called side calculates the transmission delay time Td by subtracting the transmission time T1 from the current time. The called side transmits the transmission delay time Td. The relay server 14 receives the transmission delay time Td. Further, the relay server 14 selects the maximum transmission delay time Tdmax from the transmission delay time Td received from each of the second terminal device 10b through the fourth terminal device 10d. The relay server 14 transmits the maximum transmission delay time Tdmax. The calling side receives the maximum transmission delay time Tdmax as a response. The acquisition unit 50 of the first terminal device 10a acquires the maximum transmission delay time Tdmax received. Reference is made back to FIG. 1. The acquisition unit 50 causes the storage unit 44 to store the maximum transmission delay time.

The processing unit 34 of the first terminal device 10a receives a speech signal from the microphone 40 while the PTT button of the user operation unit 36 is being pressed. The speech signal represents speech data subject to transmission. The speech data is a digital signal. The processing unit 34 subjects the speech data to a coding process and outputs the speech signal resulting from the coding process (hereinafter, also referred to as "speech data") to the communication unit 32. The communication unit 32 transmits the speech data to each of the second terminal device 10b through the fourth terminal device 10d. The transmission is equivalent to, for example, multicast transmission.

The communication unit 32 of the second terminal device 10b through the fourth terminal device 10d receives the speech data from the first terminal device 10a. The processing unit 34 decodes the received speech data and causes the decoded speech data to be output from the speaker 62 as a speech signal.

By releasing the PTT button of the user operation unit 36 of the first terminal device 10a, PTT is released. The setting unit 52 acquires the maximum transmission delay time stored in the storage unit 44. The setting unit 52 sets a prohibition period based on the maximum transmission delay time. For example, the setting unit 52 may directly use the maximum transmission delay time as the prohibition period or set the prohibition period by adding a certain period of time to the maximum transmission delay time.

Once PTT is released, the processing unit 34 starts the prohibition period timer. The processing unit 34 does not receive new speech data from the microphone 40 even if the PTT button of the user operation unit 36 is pressed during the prohibition period. Accordingly, the communication unit 32 prohibits the transmission of new speech data over the prohibition period. During the prohibition period, the monitor 38 may display a screen to show that the prohibition period is ongoing. When the prohibition period has expired, the processing unit 34 is enabled to receive speech data in response to the PTT button of the user operation unit 36 being pressed, and the communication unit 32 is enabled to transmit the speech data. In this process, the monitor 38 may display a screen to show that the prohibition period is ended.

Figure 5A:
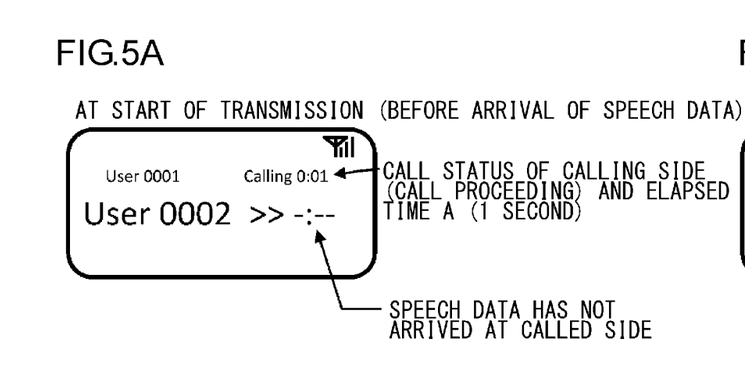
FIGS. 5A, 5B, 5C and 5D show examples of screens displayed by the monitor in the communication system of FIG. 1.

FIGS. 5A-5D show examples of screens displayed by the monitor 38 of the first terminal device 10a in the communication system 100 and show examples of on-screen display to let the user know, during the prohibition period, that the prohibition period is ongoing. FIG. 5A shows a screen displayed when the first terminal device 10a starts transmission (before the arrival of speech data). Referring to the figure, the screen shows a calling terminal device name "User0001" of the first terminal device 10a and the name of a called terminal device having the maximum transmission delay time. In this case, the second terminal device 10b (it is assumed that the transmission delay time with respect to the second terminal device 10b is 5 seconds), which is the terminal device having the maximum transmission delay time among the second terminal device 10b through the fourth terminal device 10d, is selected, and "User002" is shown as the call receiving terminal device name. When the PTT button of the first terminal device 10a is pressed, transmission is started. The monitor 38 shows the calling terminal device name "User001" of the first terminal device 10a, the elapsed time A (1 second) since the start of transmission of speech data from the first terminal device 10a, the terminal device name "User002" of the second terminal device 10b, and the elapsed time B since the point of time of arrival of the speech data at the second terminal device 10b (it is assumed that the speech data has not arrived at the called side at the illustrated point of time so that the elapsed time B is indicated by "-:--"). Concurrently, the screen shows that the call is proceeding on the calling side (indicated by the message "Calling" in FIGS. 5A-5D).

Figures 5B, 5D:
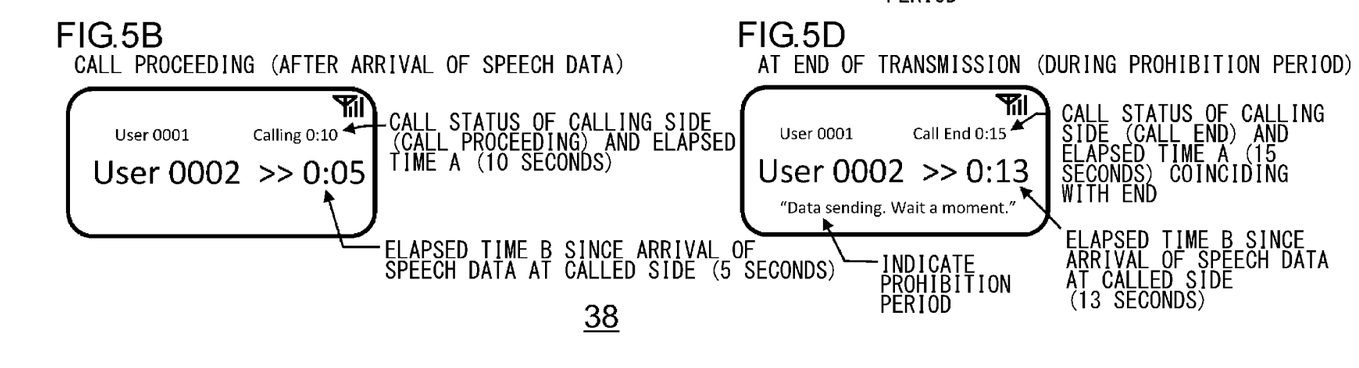

When the elapsed time A reaches the maximum transmission delay time (5 seconds) stored in the storage unit 44 since the first terminal device 10a started transmitting the speech data, it is assumed that the speech data has arrived at and is started to be received by the second terminal device 10b so that the elapsed time B of 0 second is shown (not shown). FIG. 5B shows a screen displayed when the elapsed time A has reached 10 seconds and the call from the first terminal device 10a is proceeding. The monitor 38 shows the elapsed time A of 10 seconds and the elapsed time B of 5 seconds as it is assumed that 5 seconds has elapsed since the second terminal device 10b started the reception.

Figure 5C:
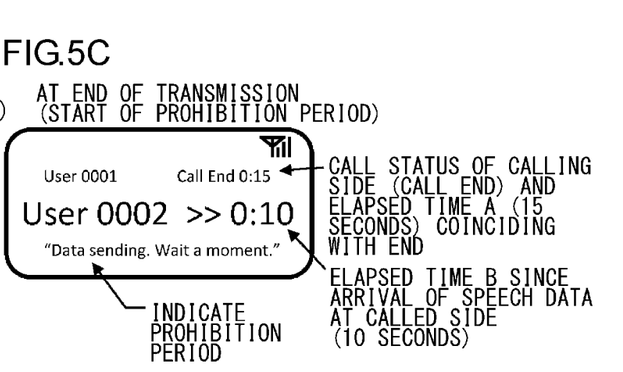

A description will now be given of a screen displayed when the first terminal device 10a has ended the transmission of the speech data (at start of the prohibition period) with reference to FIG. 5C. When PTT of the first terminal device 10a is released, the monitor 38 shows "CallEnd" to indicate that the first terminal device 10a has ended the call, and the elapsed time A (15 seconds) is no longer incremented. The screen also shows the elapsed time B (10 seconds) elapsed at that point of time since the second terminal device 10b started receiving the speech data and also shows that the prohibition period has started (indicated by the message "Data sending. Wait a moment" in FIGS. 5A-5D). However, the second terminal device 10b having the maximum transmission delay time has not completed the reception of speech data at this point of time due to the transmission delay. This is addressed by establishing the prohibition period in the setting unit 52 based on the maximum transmission delay time stored in the storage unit 44 (it is assumed here that the prohibition period lasts 5 seconds, which is equal to the maximum transmission delay time). The prohibition period can be set to any value so long as the value is equal to larger than the maximum transmission delay time.

FIG. 5D shows a screen displayed when the call is ended (during the prohibition period). The first terminal device 10a assumes that the second terminal device 10b continues the reception after the first terminal device 10a ended the call, and assumes that the reception is ended when the elapsed time B has reached 15 seconds, i.e., 10 seconds, which has elapsed when the first terminal device 10a has ended the call, plus 5 seconds, which is established as the prohibition period. It can be said that all of the second terminal device 10b through the fourth terminal device 10d have received the entirety of the speech data at this point of time. During the prohibition period, the monitor 38 of the first terminal device 10a shows that the prohibition period is ongoing (indicated by the message "Data sending. Wait a moment" in FIGS. 5A-5D). It can be said that the elapsed time A is the temporal length of the speech data transmitted from the first terminal device 10a.

The prohibition time is established based on the maximum transmission delay time. Alternatively, the difference between the elapsed time A coinciding with the end of transmission and the elapsed time B may be established as the prohibition time. Still alternatively, the period that elapses since the end of transmission until the elapsed time B reaches the elapsed time A coinciding with the end of transmission of the first terminal device 10a may be established as the prohibition period.

The features are implemented in hardware such as a CPU, a memory, or other LSI's, of any computer and in software such as a program loaded into a memory. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 6:
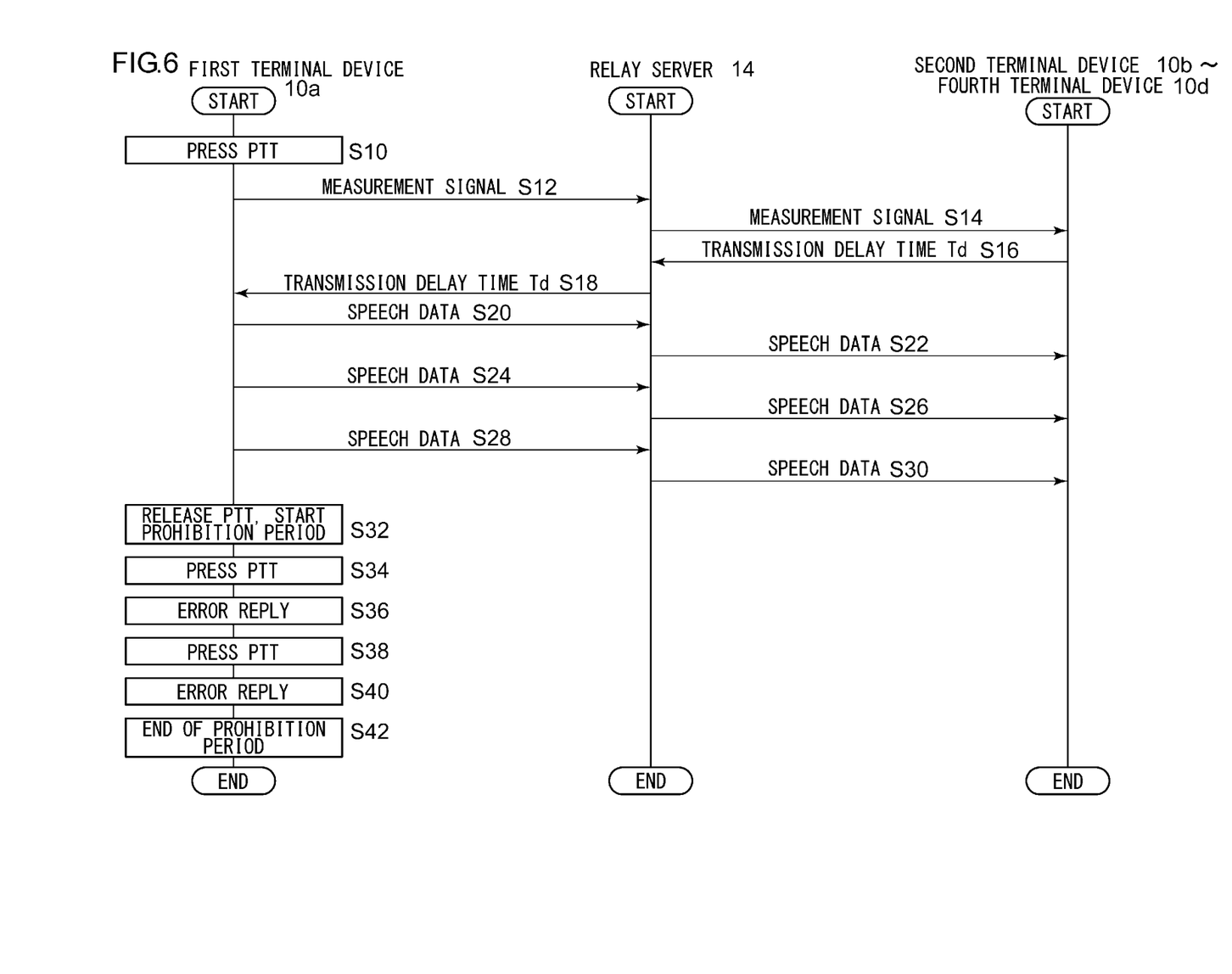
FIG. 6 is a sequence diagram showing steps of communication in the communication system of FIG. 1.

A description will be given of the operation of the communication system 100 with the above configuration. FIG. 6 is a sequence diagram showing steps of communication in the communication system 100. The diagram corresponds to the first pattern described above. In the first terminal device 10a, the PTT button is pressed (S10). The first terminal device 10a transmits a measurement signal (S12) and the relay server 14 receives the measurement signal (S14). The second terminal device 10b through the fourth terminal device 10d transmit the transmission delay time Td (S16), and the relay server 14 transmits the transmission delay time Td (S18). The first terminal device 10a transmits speech data (S20), and the relay server 14 transmits the speech data (S22). The second terminal device 10b through the fourth terminal device 10d receive the speech data.

The first terminal device 10a transmits speech data (S24), and the relay server 14 transmits the speech data (S26). The second terminal device 10b through the fourth terminal device 10d receive the speech data. The first terminal device 10a transmits speech data (S28), and the relay server 14 transmits the speech data (S30). The second terminal device 10b through the fourth terminal device 10d receive the speech data. The first terminal device 10a releases PTT and starts the prohibition period timer (S32). In the first terminal device 10a, the PTT button is pressed (S34). The first terminal device 10a outputs an error reply (S36). In the first terminal device 10a, the PTT button is pressed (S38). The first terminal device 10a outputs an error reply (S40). The first terminal device 10a ends the prohibition period timer (S42).

Figure 7:
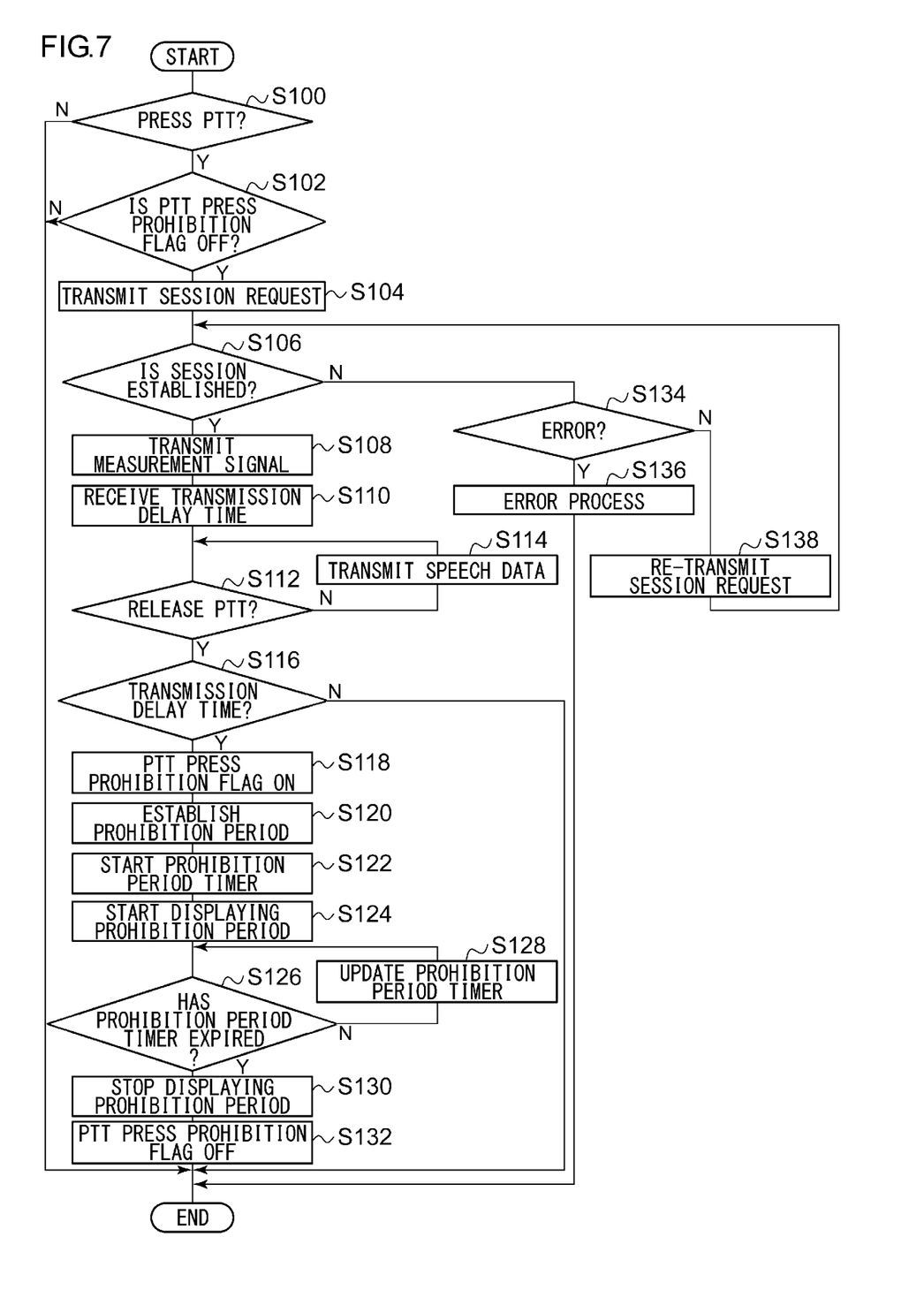
FIG. 7 is a flow chart showing steps of communication in the communication system of FIG. 1.

FIG. 7 is a flowchart showing steps of communication in the communication system 100. The PTT button is pressed (Y in S100). If a PTT press prohibition flag is off (Y in S102), the communication unit 32 transmits a session request (S104). If the session is established (Y in S106), the communication unit 32 transmits a measurement signal (S108) and receives the transmission delay time (S110). If PTT is not released (N in S112), the communication unit 32 transmits speech data (S114) and returns to step 112.

If PTT is released (Y in S112) and if there is a transmission delay time (Y in S116), the processing unit 34 turns the PTT press prohibition flag on (S118). The setting unit 52 sets the prohibition period period (S120), and the processing unit 34 starts the prohibition period timer (S122). The monitor 38 starts displaying the prohibition period (S124). If the prohibition period timer has not expired (N in S126), the processing unit 34 updates the prohibition period timer (S128) and returns to step 126. If the prohibition period timer has expired (Y in S126), the monitor 38 stops displaying the prohibition period (S130). The processing unit 34 turns the PTT press prohibition flag off (S132).

If the PTT button is not pressed (N in S100), or if the PTT press prohibition flag is not off (N in S102), the process is terminated. If a session is not established (N in S106) and if an error occurs (Y in S134), the processing unit 34 performs an error process (S136) and the process is terminated. If an error does not occur (N in S134), the communication unit 32 re-transmits a session request (S138) and returns to step 106. If there is no transmission delay time (N in S116), the process is terminated.

According to the embodiment, transmission of new speech data is prohibited after the end of transmission of the speech data, over a prohibition period based on the maximum transmission delay time selected from the transmission delay time with respect to each of a plurality of further terminal devices. Therefore, continuous acquisition of a right to make a call is inhibited. Since continuous acquisition of a right to make a call is inhibited, opportunities for transmission are equalized. Since the prohibition period is established based on the maximum transmission delay time, opportunities for transmission in the terminal device having the maximum transmission delay time are increased. Since it is only necessary to establish the prohibition period after the end of transmission of the speech data, opportunities for transmission are equalized by a simple process. Since the transmission delay time from the first terminal device to the further terminal device is used, derivation of the transmission delay time is easy. Since the measurement signal is transmitted separately from the speech data, the transmission delay time is acquired prior to transmission of the speech data.

Embodiment 2

A description will now be given of embodiment 2. Like embodiment 1, embodiment 2 relates to PoC terminal devices that perform PoC group communication. The PoC terminal device according to embodiment 2 establishes a prohibition period based on the maximum transmission delay time, as in the case of embodiment 1. However, the definition of the maximum transmission delay time used to establish a prohibition period differs between embodiment 1 and embodiment 2. The communication system 100 according to embodiment 2 is of the same type as that of FIG. 1. The following description highlights the difference.

Figure 8:
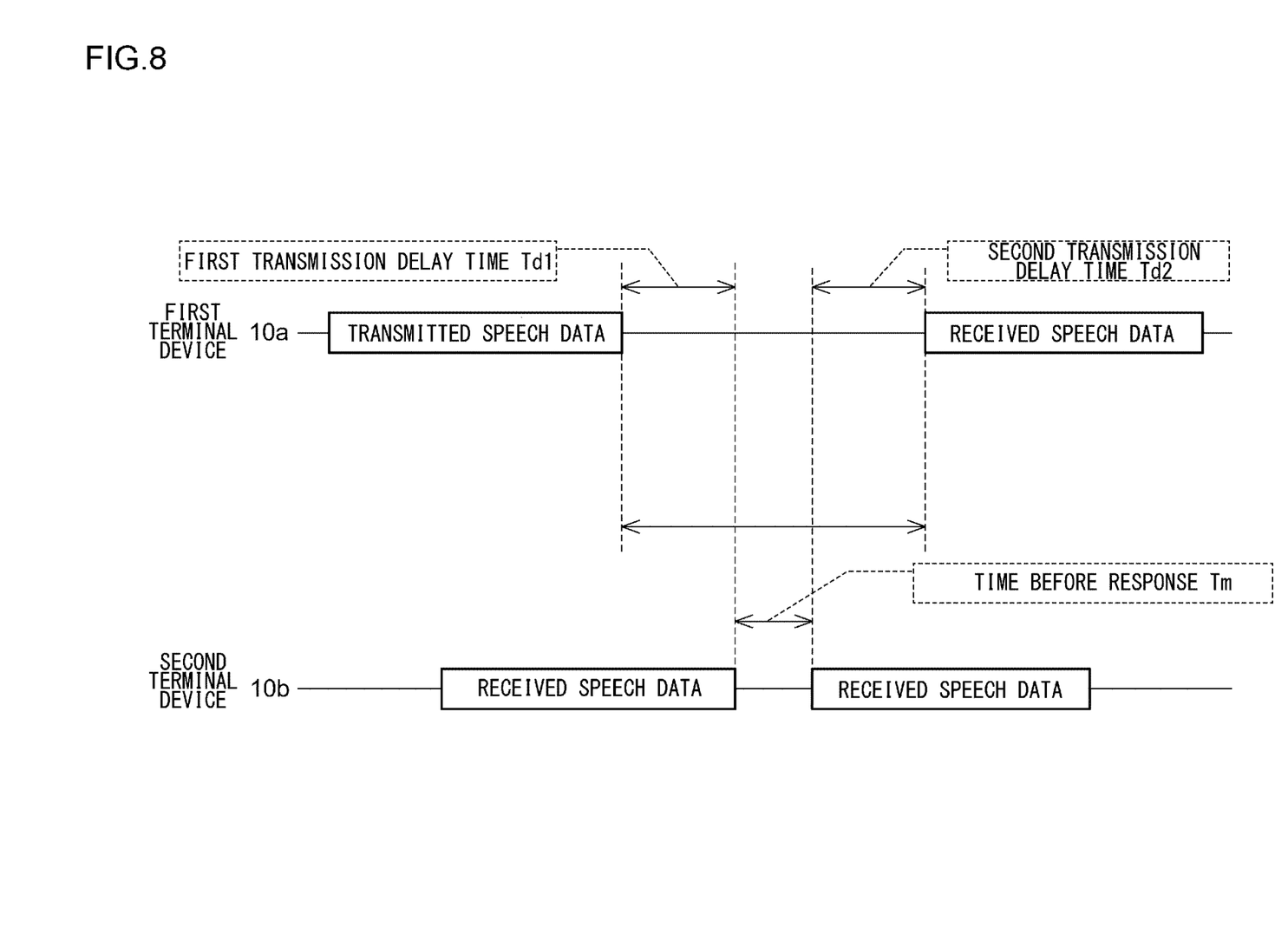
FIG. 8 shows an outline of the operation in the communication system according to embodiment 2.

FIG. 8 shows an outline of the operation in the communication system 100. FIG. 8 shows the first terminal device 10a as the calling side and the second terminal device 10b as the called side with the maximum transmission delay time from the first terminal device 10a. The first transmission delay time Td1 in FIG. 8 corresponds to the transmission delay time Td described so far. It can therefore be said that the second terminal device 10b is the terminal device 10 with the maximum first transmission delay time Td1. In embodiment 2, the second transmission delay time Td2 from the second terminal device 10b to the first terminal device 10a is also considered. By considering the second transmission delay time Td2 in addition to the first transmission delay time Td1, the prohibition period is extended. In the second terminal device 10b, the time that elapses since the end of reproduction of the received speech data until an instruction responsive to the transmitted speech data is input, i.e., a period of time required to make a response, is indicated by Tm.

When the PTT button of the user operation unit 36 of FIG. 1 is pressed, the acquisition unit 50 of the first terminal device 10a acquires the maximum transmission delay time by referring to the transmission delay time with respect to each of the plurality of further terminal devices 10. The transmission delay time is defined as a sum of the first transmission delay time from the first terminal device 10a to the further terminal device 10 and the second transmission delay time from the further terminal device 10 to the first terminal device 10a. The acquisition unit 50 transmits a measurement signal for measuring the transmission delay time to each of the plurality of further terminal devices 10 separately from the speech data. Four patterns of processes whereby the acquisition unit 50 acquires the maximum transmission delay time will be described below but only one of the processes may be performed.

Figure 9A:
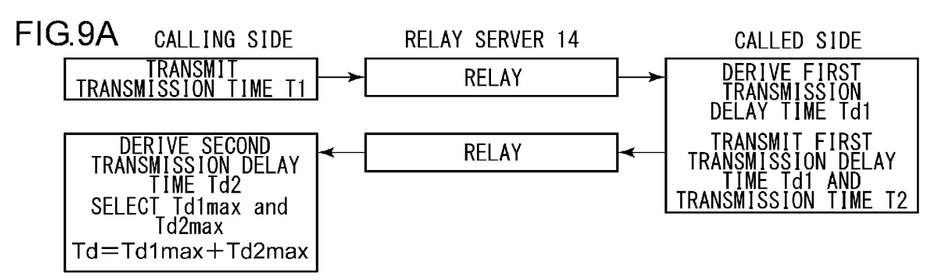
FIGS. 9A, 9B, 9C and 9D show another outline of the operation of the communication system according to embodiment 2.

FIGS. 9A-9D show another outline of the operation of the communication system 100. As in FIGS. 4A-4D, "calling side" corresponds to the first terminal device 10a, and "called side" corresponds to each of the second terminal device 10b through the fourth terminal device 10d. FIG. 9A shows the first pattern. The calling side transmits a transmission time T1 as a measurement signal. The relay server 14 relays the transmission time T1. The called side receives the transmission time T1 and acquires the current time coinciding with the reception. The called side derives the first transmission delay time Td1 by subtracting the transmission time T1 from the current time. The called side transmits the first transmission delay time Td1 and the transmission time T2. The transmission time T2 also corresponds to the measurement signal. The relay server 14 relays the first transmission delay time Td1 and the transmission time T2. The calling side receives the first transmission delay time Td1 and the transmission time T2 as a response.

The called side derives the second transmission delay time Td2 by subtracting the transmission time T2 from the current time. As mentioned above, the called side is the second terminal device 10b through the fourth terminal device 10d. Therefore, the above process is performed for each of the second terminal device 10b through the fourth terminal device 10d. The acquisition unit 50 of the first terminal device 10a selects the maximum first transmission delay time Td1max and the maximum second transmission delay time Td2max from the first transmission delay time Td1 and the second transmission delay time Td2 for each of the second terminal device 10b through the fourth terminal device 10d. The acquisition unit 50 derives the transmission delay time Td by adding the maximum first transmission delay time Td1max and the maximum second transmission delay time Td2max.

Figure 9B:
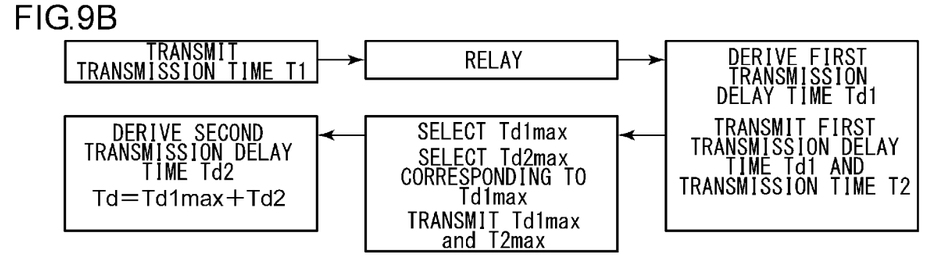

FIG. 9B shows the second pattern. The calling side transmits the transmission time T1 as a measurement signal. The relay server 14 relays the transmission time T1. The called side receives the transmission time T1 and acquires the current time coinciding with the reception. The called side derives the first transmission delay time Td1 by subtracting the transmission time T1 from the current time. The called side transmits the first transmission delay time Td1 and the transmission time T2.

The relay server 14 selects the maximum first transmission delay time Td1max by referring to the first transmission delay time Td1 for each of the second terminal device 10b through the fourth terminal device 10d. Further, the relay server 14 selects the transmission time T2 from the terminal device 10 transmitting the maximum first transmission delay time Td1max thus selected, as T2max. The relay server 14 transmits Td1max and T2max. The calling side receives Td1max and T2max as a response. The calling side derives the second transmission delay time Td2 by subtracting the transmission time T2max from the current time. The acquisition unit 50 of the first terminal device 10a derives the transmission delay time Td by adding the maximum first transmission delay time Td1max and the second transmission delay time Td2.

Figure 9C:
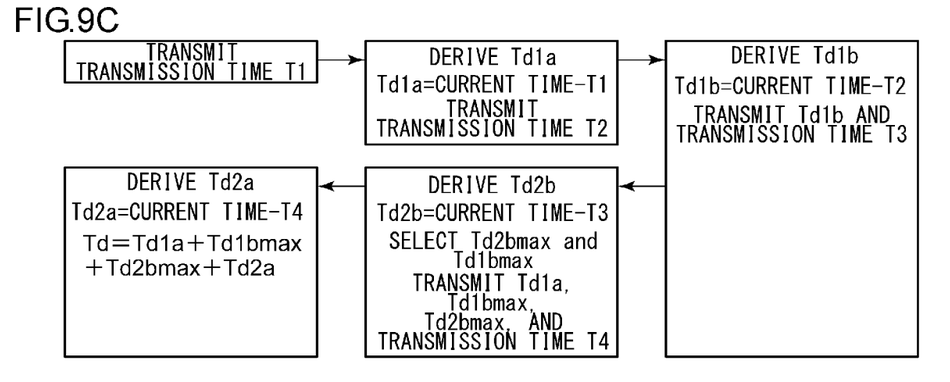

FIG. 9C shows the third pattern. The calling side transmits the transmission time T1 as a measurement signal. The relay server 14 derives Td1a by subtracting the transmission time T1 from the current time. The relay server 14 transmits the transmission time T2. The called side receives the transmission time T2 and acquires the current time coinciding with the reception. The called side derives Td1b by subtracting the transmission time T2 from the current time. The called side transmits Td1b and the transmission time T3.

The relay server 14 derives Td2b by subtracting the transmission time T3 from the current time. The relay server 14 selects maximum Td1bmax by referring to Td1b for each of the second terminal device 10b through the fourth terminal device 10d, and selects maximum Td2bmax by referring to Td2b for each of the second terminal device 10b through the fourth terminal device 10d. The relay server 14 transmits Td1a, Td1bmax, Td2bmax, and the transmission time T4. The calling side receives Td1a, Td1bmax, Td2bmax, and the transmission time T4 as a response. The acquisition unit 50 of the first terminal device 10a derives Td2a by subtracting the transmission time T4 from the current time. The acquisition unit 50 derives the transmission delay time Td by adding Td1a, Td1bmax, Td2bmax, and Td2a.

Figure 9D:
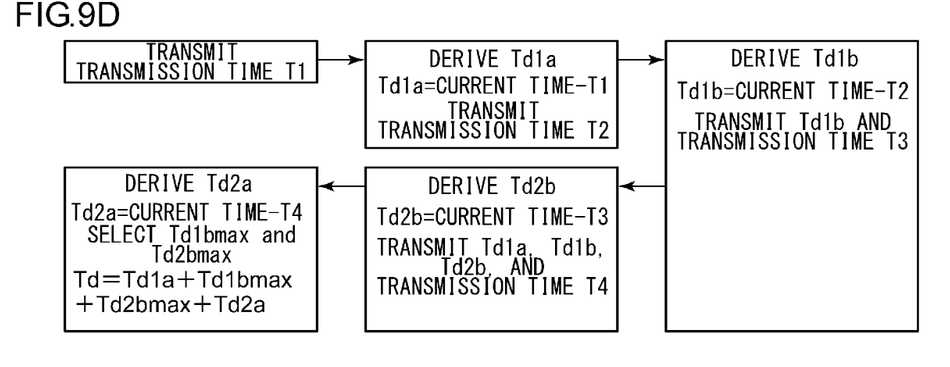

FIG. 9D shows the fourth pattern. The calling side transmits the transmission time T1 as a measurement signal. The relay server 14 derives Td1a by subtracting the transmission time T1 from the current time. The relay server 14 transmits the transmission time T2. The called side receives the transmission time T2 and acquires the current time coinciding with the reception. The called side derives Td1b by subtracting the transmission time T2 from the current time. The called side transmits Td1b and the transmission time T3.

The relay server 14 derives Td2b by subtracting the transmission time T3 from the current time. The relay server 14 transmits Td1a, Td1b, Td2b, and the transmission time T4. The calling side receives Td1a, Td1b, Td2b, and the transmission time T4 as a response. The acquisition unit 50 of the first terminal device 10a derives Td2a by subtracting the transmission time T4 from the current time. The acquisition unit 50 selects maximum Td1bmax by referring to Td1b for each of the second terminal device 10b through the fourth terminal device 10d, and selects maximum Td2bmax by referring to Td2b for each of the second terminal device 10b through the fourth terminal device 10d. The acquisition unit 50 derives the transmission delay time Td by adding Td1a, Td1bmax, Td2bmax, and Td2a.

Figure 10:
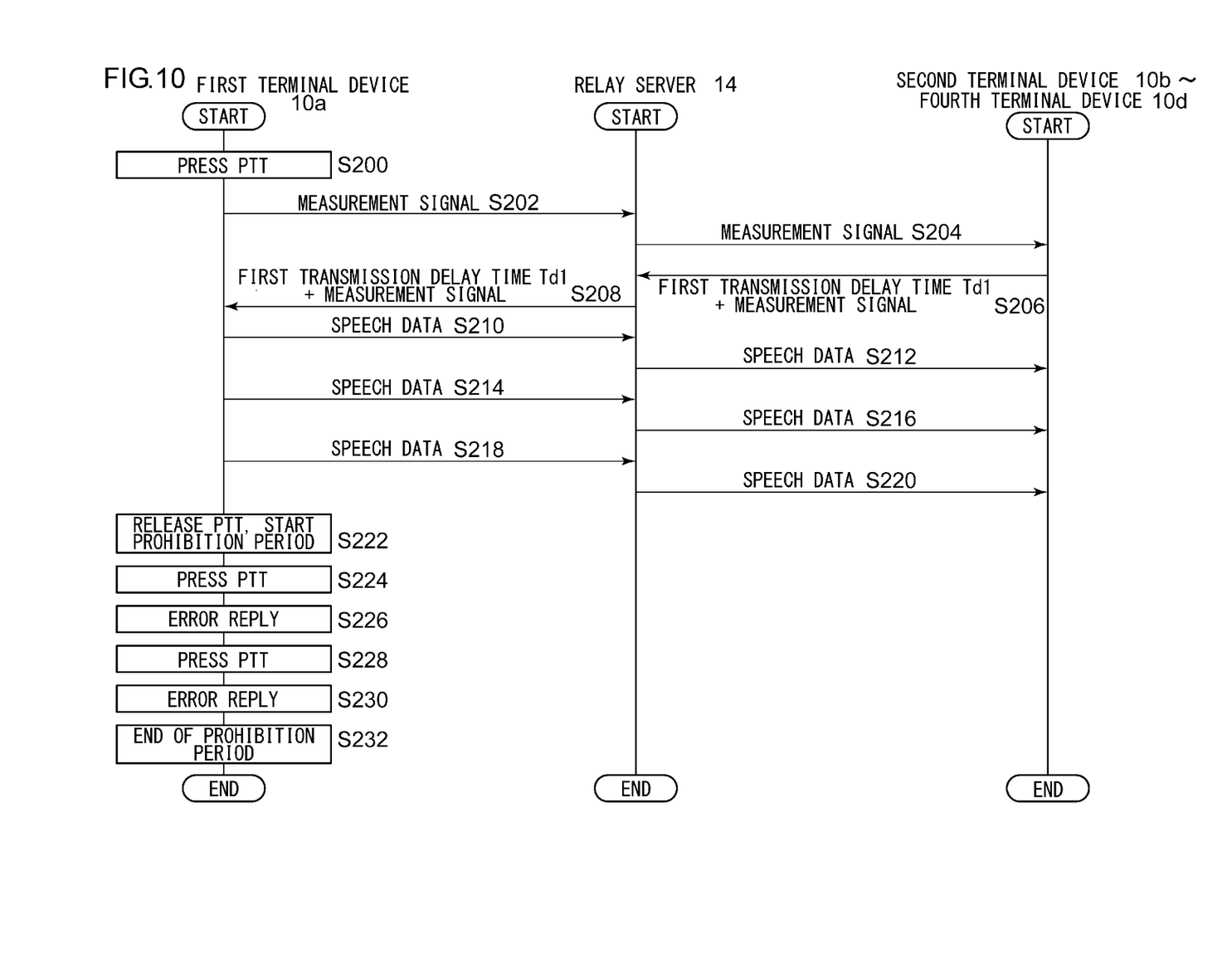
FIG. 10 is a sequence diagram showing steps of communication in the communication system according to embodiment 2.

FIG. 10 is a sequence diagram showing steps of communication in the communication system 100. The diagram corresponds to the first pattern described above. In the first terminal device 10a, the PTT button is pressed (S200). The first terminal device 10a transmits a measurement signal (S202) and the relay server 14 transmits the measurement signal (S204). The second terminal device 10b through the fourth terminal device 10d transmit the first transmission delay time Td1 and the measurement signal (S206), and the relay server 14 transmits the first transmission delay time Td1 and the measurement signal (S208). The first terminal device 10a transmits speech data (S210), and the relay server 14 transmits the speech data (S212). The second terminal device 10b through the fourth terminal device 10d receive the speech data.

The first terminal device 10a transmits speech data (S214), and the relay server 14 transmits the speech data (S216). The second terminal device 10b through the fourth terminal device 10d receive the speech data. The first terminal device 10a transmits speech data (S218), and the relay server 14 transmits the speech data (S220). The second terminal device 10b through the fourth terminal device 10d receive the speech data. The first terminal device 10a releases PTT and starts the prohibition period timer (S222). In the first terminal device 10a, the PTT button is pressed (S224). The first terminal device 10a outputs an error reply (S226). In the first terminal device 10a, the PTT button is pressed (S228). The first terminal device 10a outputs an error reply (S230). The first terminal device 10a ends the prohibition period timer (S232).

According to this embodiment, the sum of the first transmission delay time from the first terminal device to the further terminal device and the second transmission delay time from the further terminal device to the first terminal device is defined as the transmission delay time. It is therefore possible to establish a prohibition period that provides for more equalized opportunities for transmission.

Described above is an explanation based on an exemplary embodiment. The embodiment is intended to be illustrative only and it will be understood by those skilled in the art that various modifications to constituting elements and processes could be developed and that such modifications are also within the scope of the present invention.

In embodiments 1 and 2, the communication system 100 uses the business wireless system in which the PoC technology is used. Alternatively, wireless communication systems other than the business wireless system using the PoC technology may be used. According to this variation, the flexibility of the configuration is improved.

In embodiments 1 and 2, the acquisition unit 50 transmits the measurement signal and the speech data separately. Alternatively, the acquisition unit 50 may transmit the measurement signal to each of the plurality of terminal devices 10 so as to accompany the speech data. According to this variation, the measurement signal accompanies the speech data so that the frequency of transmitting the measurement signal is improved. Since the frequency of transmitting the measurement signal is improved, the precision of setting the prohibition period is improved.

What is claimed is:

1. A communication terminal device comprising:
a communication unit that transmits a measurement signal to a plurality of further terminal devices and receives a maximum first transmission delay time and a transmission time,
wherein the maximum first transmission delay time being identified by referring to a plurality of first transmission delay times, wherein each of the plurality of first transmission delay times is calculated by each of the plurality of further terminal devices as elapsing from the communication terminal device to such further terminal device, and
wherein the transmission time indicating a point of time of transmission from the further terminal device having the maximum first transmission delay time; and
a processing unit that:
calculates, by referring to the received transmission time, a second transmission delay time from the further terminal device, which has transmitted the maximum first transmission delay time, to the communication terminal device,
calculates a maximum transmission delay time by adding the maximum first transmission delay time and the second transmission delay time, and
does not receive new data over the maximum transmission delay time after the communication unit has transmitted data.

2. The communication terminal device according to claim 1, further comprising:
a storage unit that stores the maximum transmission delay time,
wherein the processing unit includes an acquisition unit and a setting unit,
wherein the acquisition unit calculates the second transmission delay time and the maximum transmission delay time and outputs the calculated maximum transmission delay time to the storage unit,
wherein the setting unit sets, after the communication unit has transmitted the data, a prohibition period based on the maximum transmission delay time acquired from the storage unit, and
wherein the processing unit does not receive new data over the prohibition period set by the setting unit.

3. The communication terminal device according to claim 1, further comprising:
a display unit, wherein the display unit displays prohibition of transmission over the prohibition period.

4. The communication terminal device according to claim 3, wherein the display unit displays a situation of reception of data in the further terminal device having the maximum transmission delay time.

5. The communication terminal device according to claim 4, wherein the situation of reception shows an elapsed time since the data is received in the further terminal having the maximum transmission delay time.

6. The communication terminal device according to claim 2, wherein the acquisition unit transmits a measurement signal for measuring a transmission delay time to each of the plurality of further terminal devices separately from the data.

7. The communication terminal device according to claim 2, wherein the acquisition unit transmits, to each of the plurality of further terminal devices, the measurement signal for measuring a transmission delay time so as to accompany the data.

8. A communication method performs by a communication terminal device, the method comprising:
transmitting a measurement signal to a plurality of further terminal devices and receiving a maximum first transmission delay time and a transmission time,
wherein the maximum first transmission delay time being identified by referring to a plurality of first transmission delay times, wherein each of the plurality of first transmission delay times is calculated by each of the plurality of further terminal devices as elapsing from the communication terminal device to such further terminal device, and
wherein the transmission time indicating a point of time of transmission from the further terminal device having the maximum first transmission delay time;
calculating, by referring to the received transmission time, a second transmission delay time from the further terminal device, which has transmitted the maximum first transmission delay time, to the communication terminal device;
calculating a maximum transmission delay time by adding the maximum first transmission delay time and the second transmission delay time; and
prohibiting new data from being transmitted over the maximum transmission delay time after data has been transmitted.

* * * * *